(No Model.)

A. P. GORDON.
PROPELLER.

No. 508,383. Patented Nov. 7, 1893.

Witnesses
Geo. F. Kincaid

Inventor
A. P. Gordon
by John Wedderburn
his Attorney

UNITED STATES PATENT OFFICE.

AMHERST P. GORDON, OF SAN FRANCISCO, CALIFORNIA.

PROPELLER.

SPECIFICATION forming part of Letters Patent No. 508,383, dated November 7, 1893.

Application filed November 4, 1892. Serial No. 450,993. (No model.)

*To all whom it may concern:*

Be it known that I, AMHERST P. GORDON, of San Francisco, in the county of San Francisco and State of California, have invented certain new and useful Improvements in Propellers; and I do hereby declare the following to be a full, clear, and exact description of the invention, such as will enable others skilled in the art to which it appertains to make and use the same.

My invention is an improvement in propellers, designed for its simplicity of construction and efficiency of operation.

By the use of my improved form of propeller, a greater amount of power is developed from a given horse power than can be developed by the use of the ordinary style.

My invention more particularly resides in the novel combination, construction and arrangement of parts hereinafter fully described and set forth in the claim.

Figure 1:
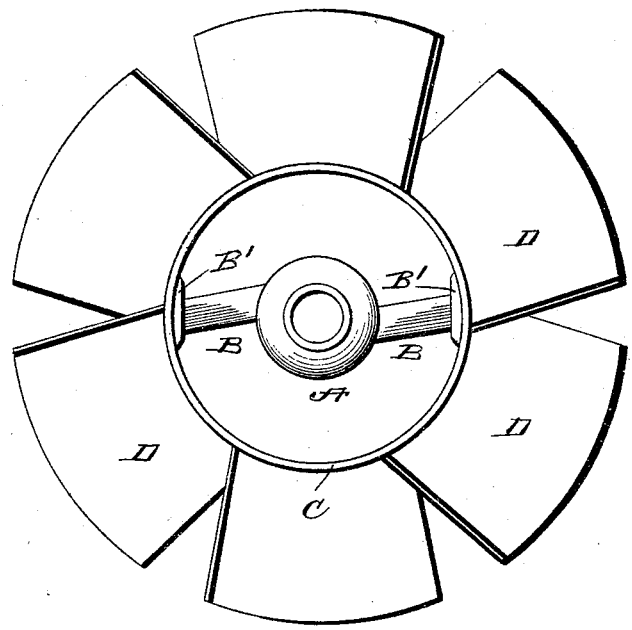
Figure 2:
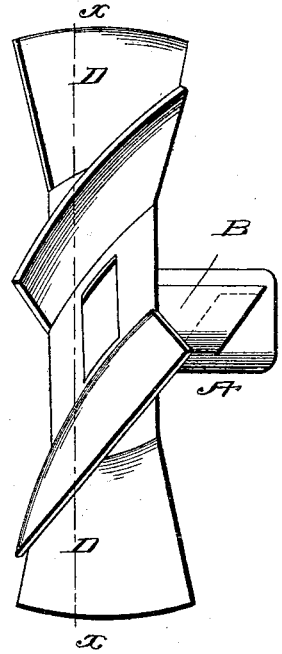
Figure 3:
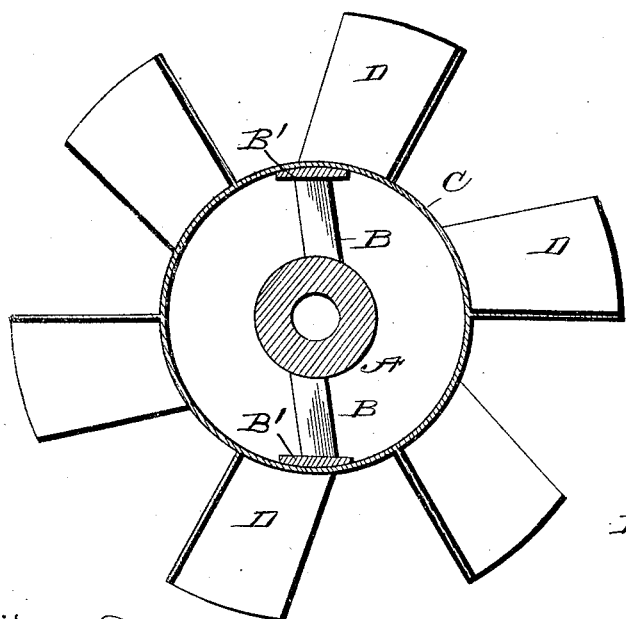
Figure 4:
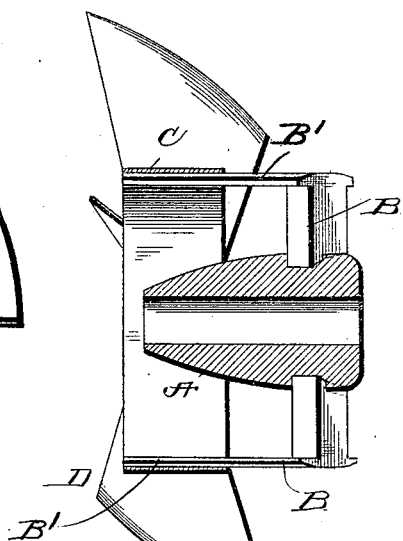

In the accompanying drawings in which similar letters of reference designate corresponding parts, Figure 1 is a front elevation. Fig. 2 is a side elevation. Fig. 3 is a section through the line $x$—$x$ Fig. 2, and Fig. 4 is a section through the line $y$—$y$ Fig. 1.

A is a central frusto-conical hub from which extend braces B so shaped as to present as little resisting surface as possible to the water, but assist in propulsion, the said braces B being radially and spirally arranged and having horizontal arms B' extending outwardly therefrom. To the outer extremities of the arms B' is secured the circular rim C, to which are secured the required number of blades D.

By the use of the conical shaped hub, the amount of drag of the water is reduced to a minimum, and by means of the open center between the hub and circular rim, the amount of dead power lost when the ordinary style of propeller is used, is overcome.

The construction and arrangement of the several parts of my propeller being thus made known, the operation and the advantages of the same will, it is thought, be readily understood.

I am aware that changes in the proportion of parts of the device herein shown and described as an embodiment of my invention can be made without departing from the spirit or sacrificing the advantages thereof, and I therefore reserve the right to make such changes and alterations as fairly fall within the scope of my invention.

Having thus fully described my invention, what I claim, and desire to secure by Letters Patent, is—

In a propeller, the combination with a central frusto conical hub having radial braces arranged in spiral lines and provided with outer horizontal arms projecting therefrom, an outer rim secured to said horizontal arms at a distance from said braces, thereby forming an open center, and curved blades attached to and projecting outwardly from said rim, substantially as described.

In testimony whereof I have signed this specification in the presence of two subscribing witnesses.

A. P. GORDON.

Witnesses:
   GEO. T. KNOX,
   W. A. MARSHALL.